United States Patent Office 3,337,641
Patented Aug. 22, 1967

3,337,641
PROCESS FOR THE PURIFICATION OF IMPURE 2,6-DIMETHYLPHENOL CONTAINING CRESOLS AS IMPURITIES
Jan Bussink, Arnhem, Netherlands, assignor to N.V. Onderzoekingsinstituut Research, Arnhem, Netherlands, a corporation of the Netherlands
No Drawing. Filed Oct. 8, 1963, Ser. No. 314,600
Claims priority, application Netherlands, Nov. 2, 1962, 285,017
8 Claims. (Cl. 260—621)

The invention relates to a process for the purification of 2,6-dimethylphenol.

Processes for purifying 2,6-dimethylphenol are known. However, the known processes show serious drawbacks inasmuch as the impurities associated with 2,6-dimethylphenol to a considerable extent consist of cresols, which are very difficult to separate from the 2,6-dimethylphenol. For instance, only a small fraction of the orthocresol can be removed by means of distillation, whereas metacresol and paracresol are hardly removed at all by distillation. Sublimation does not serve to improve the purity of 2,6-dimethylphenol. Purification by subjecting the 2,6-dimethylphenol in an aqueous alkaline solution to steam distillation is very cumbersome, and moreover in such an alkaline medium oxidation of the compound to be purified readily occurs as a result of which the product obtained is mostly highly colored.

Moreover, the 2,6-dimethylphenol product obtained in this way is not sufficiently pure to be used as a starting material for polymerization reactions. Since the 2,6-dimethylphenol is the starting material for the preparation of aromatic polyethers which have very favorable properties in certain respects, there is a great need for a simple process by which this compound can be purified to such an extent that it is suitable to be used as a starting material for polymerization reactions.

It is therefore an object of the present invention to provide such a process.

According to the present invention, the 2,6-dimethylphenol is melted together with not more than 30% by weight of an aliphatic carboxylic acid having not more than 9 carbon atoms, after which the melted mixture is solidified and the carboxylic acid, with the impurities dissolved therein, is thereupon removed from the solidified mass.

Whereas 2,6-dimethylphenol cannot (or can only to an absolutely insufficient extent) be purified by re-crystallization in the usual manner, the purification by the process according to the present invention gives eminently satisfactory results. When use is made of the process according to the present invention, about 90% of the impurities originally present are removed. By carrying out the process twice in succession about 99% of the impurities can be removed. This is surprising, because it is known that re-crystallization gives good results only if the amount of solvent is large in proportion to the amout of the compound to be re-crystallized, and that re-crystallization carried out in the usual manner from good or poor solvents for the 2,6-dimethylphenol does not at all (or does only to a highly insufficient degree) lead to purification of the product.

The aliphatic carboxylic acids used in the process according to the present invention may have straight or branched chains. Unsaturated aliphatic carboxylic acids are also suitable. Examples of suitable acids are: formic acid, acetic acid, propionic acid, butyric acid, isobutyric acid, caproic acid and pelargonic acid. It is preferred to use acetic acid, however, because with the aid of this acid the highest purity and yield are obtained.

The process can be carried out not only with the aid of pure acids, but also with mixtures of these acids or with acids containing a certain amount of water or some other compound which is miscible with the acid.

The amount of the aliphatic carboxylic acid used may vary between relatively wide limits. If the amount is larger than 30% by weight, calculated on the compound to be purified, then while a satisfactory purification can be obtained, the losses of 2,6-dimethylphenol will then be so great that, for reasons of economy, the process is no longer suitable. Hence, the value 30% by weight represents a good practical upper limit. On the other hand, it is preferred not to use very small amounts, for instance smaller than 3% by weight, because when in that case the carboxylic acid is removed from the solidified mass, a relatively large amount of impure carboxylic acid adheres to the 2,6-dimethylphenol, as a result of which the purification process is not quite so efficacious. A good working range for the acid, then, is from about 3% to 30%, by weight.

When use is made of acetic acid, the best results are obtained when it is employed in an amount of 15% by weight, calculated on the 2,6-dimethylphenol. In that case the product obtained is of a satisfactory purity, and the yield is favorable.

The step of melting the 2,6-dimethylphenol together with the carboxylic acid may be carried out by any convenient method. For instance, the acid may first be heated, after which the compound to be purified is added with stirring. As soon as the mass has melted, it may then be solidified. Preferably, this is carried out rapidly by cooling. The mass is preferably cooled down to below 0° C., because in that way the highest yield of product is obtained.

After the 2,6-dimethylphenol has solidified, the acid and the impurities dissolved therein must still be separated from the solid substance. This may be done in a very simple way by squeezing out the mass, and removing the liquid thus liberated.

When the greater part of the acid has been removed mechanically, the remainder is removed preferably by washing the mass with a solvent for the acid. Some examples of suitable solvents are: water, petroleum ether and aromatic hydrocarbon solvents. Very good results are obtained when use is made of toluene. With the aid of toluene the remainder of the acid and the impurities dissolved therein are removed very thoroughly, and the remaining toluene can be removed and recovered in a very simple manner.

When applied on an industrial scale, the process according to the present invention is preferably carried out in a continuous manner. To this end use may be made of apparatus the construction of which is obvious to a man skilled in the art. The continuous removal of the acid from the solidified mass is preferably effected in a centrifuge in which also the washing treatment may be carried out.

The invention will be further elucidated by means of the following examples, which are to be regarded as illustrative and not as limiting.

*Example I*

3,000 g. 2,6-dimethylphenol containing as impurities 5.9% by weight of cresols is melted by heating it to above 52° C. Subsequently, 500 g. glacial acetic acid is added, after which the mixture is cooled down to 0° C. The mass then obtained is freed from the liquid by squeezing. The resulting solid product still contains some acetic acid and 0.7% by weight of cresols.

Next, the acetic acid adhering to the crystals is removed by washing the squeezed mass with toluene at 0° C. The remaining toluene is removed in vacuo. The 2,6-dimethylphenol thus obtained contains only 0.2% by weight of cresols.

The yield of the purified product is 2,500 g.

*Example II*

3,000 g. 2,6-dimethylphenol containing as impurities 5.9% by weight of mixed cresols is melted by heating it to above 52° C. Subsequently, 500 g. glacial acetic acid is added, after which the mixture is cooled down to 0° C.

The liquid present in the mass then obtained is to a considerable extent removed therefrom by centrifuging. After centrifuging the weight of the mass is 2,600 g. Glacial acetic acid is added to the mass in an amount of 400 g., after which the temperature is raised to 60° C. The liquid obtained is cooled down to 0° C. The resulting mass is to a considerable extent freed from the liquid by means of centrifuging, after which it is washed with petroleum ether. After drying in vacuo, purified 2,6-dimethylphenol is obtained containing not more than 0.03% by weight of impurities. This product is eminently suitable for use as a starting material for a polymerization reaction.

*Example III*

3,000 g. 2,6-dimethylphenol containing as impurities 8% by weight of mixed cresols is melted in the presence of 800 g. caproic acid. Subsequently, the mass is cooled down to 5° C., after which the liquid is squeezed out of the mass.

The squeezed mass is washed with water and dried.

The yield is 2,600 g. of purified 2,6-dimethylphenol product containing 0.6% by weight of impurities.

*Example IV*

The same starting material is purified in the manner described above in Example III, except that now use is made of 600 g. propionic acid, and that the mass is cooled down to −18° C. In this way a purified 2,6-dimethylphenol product is obtained which contains 0.5% by weight of impurities.

While specific examples of preferred methods embodying the present invention have been set forth above, it will be understood that many changes and modifications may be made in the methods of procedure without departing from the spirit of the invention. It will therefore be understood that the examples cited and the particular proportions and methods of operation set forth above are intended to be illustrative only, and are not intended to limit the scope of the invention.

What is claimed is:

1. A process for the purification of an impure 2,6-dimethylphenol containing cresols as impurities, comprising melting the impure 2,6-dimethylphenol together with not more than about 30% by weight of an aliphatic carboxylic acid having not more than 9 carbon atoms and selected from the class consisting of formic acid, acetic acid, propionic acid, butyric acid, isobutyric acid, caproic acid and pelargonic acid, cooling the melted mixture to a solidified mass, and separating the solidified mass into a liquid phase comprising the said aliphatic carboxylic acid and a substantial portion of the cresolic impurities and a solid phase consisting essentially of purified 2,6-dimethylphenol.

2. A process according to claim 1, wherein the said aliphatic carboxylic acid is acetic acid.

3. A process according to claim 2, wherein the acetic acid is employed in an amount of about 15% by weight, calculated on the 2,6-dimethylphenol.

4. A process according to claim 1, wherein the melted mixture is cooled to below 0° C.

5. A process according to claim 1, wherein the solidified mass is separated into a liquid phase and a solid phase by squeezing it.

6. A process according to claim 1, wherein the greater part of the liquid phase is separated from the solidified mass mechanically, after which the remainder is removed by washing the mass with a solvent for the liquid phase.

7. A process according to claim 6, wherein the solvent for the liquid phase is selected from the class consisting of water, petroleum ether and toluene.

8. A process according to claim 7, wherein the solvent for the acid is toluene.

References Cited

UNITED STATES PATENTS 1,980,385   11/1934   Comte et al.
2,095,801   10/1937   Engel _____ 260—621 X LEON ZITVER, *Primary Examiner.*

DANIEL D. HORWITZ, *Examiner.*

H. W. ROBERTS, D. M. HELFER, *Assistant Examiners.*